United States Patent
Sasai

(10) Patent No.: US 7,434,599 B2
(45) Date of Patent: Oct. 14, 2008

(54) HOSE AND METHOD OF PRODUCING THE SAME

(75) Inventor: Kensuke Sasai, Komaki (JP)

(73) Assignee: Tokai Rubber Industries, Ltd., Aichi-ken (JP)

( * ) Notice: Subject to any disclaimer, the term of this patent is extended or adjusted under 35 U.S.C. 154(b) by 0 days.

(21) Appl. No.: 11/385,753

(22) Filed: Mar. 22, 2006

(65) Prior Publication Data

US 2006/0213569 A1    Sep. 28, 2006

(30) Foreign Application Priority Data

Mar. 22, 2005    (JP)    ............... 2005-082225

(51) Int. Cl.
*F16L 11/00*    (2006.01)
*B21B 1/46*    (2006.01)

(52) U.S. Cl. ............... 138/138; 138/143; 138/146; 29/527.1

(58) Field of Classification Search ............... 138/127, 138/138, 143, 146; 29/527.1
See application file for complete search history.

(56) References Cited

U.S. PATENT DOCUMENTS

| 4,467,002 | A | * | 8/1984 | Crofts | ............... | 428/34.9 |
|---|---|---|---|---|---|---|
| 4,606,953 | A | * | 8/1986 | Suzuki et al. | ............... | 138/143 |
| 4,696,724 | A | * | 9/1987 | Deguchi et al. | ............... | 205/197 |
| 4,916,031 | A | * | 4/1990 | Kitamura et al. | ............... | 428/626 |
| 5,271,977 | A | * | 12/1993 | Yoshikawa et al. | ............... | 428/35.9 |
| 5,476,121 | A | * | 12/1995 | Yoshikawa et al. | ............... | 138/138 |
| 6,131,614 | A | * | 10/2000 | Eastham et al. | ............... | 138/110 |
| 6,546,963 | B2 | * | 4/2003 | Nuss | ............... | 138/141 |
| 2006/0141267 | A1 | * | 6/2006 | Okura et al. | ............... | 428/432 |

FOREIGN PATENT DOCUMENTS

JP    8-269723    10/1996

\* cited by examiner

*Primary Examiner*—James F Hook
(74) *Attorney, Agent, or Firm*—Westerman, Hattori, Daniels & Adrian, LLP

(57) ABSTRACT

A hose and a method of producing the same. The hose includes a tubular resin inner layer, a metal plating layer formed on an outer peripheral surface of the resin inner layer, and a resin outer layer formed on an outer peripheral surface of the metal plating layer, wherein a chromium oxide film is formed on the outer peripheral surface of the resin inner layer and a metal film is formed on an outer peripheral surface of the chromium oxide film between the resin inner layer and the metal plating layer and the metal plating layer is formed on an outer peripheral surface of the metal film. Further, a chromium oxide film is formed between the metal plating layer and the resin outer layer.

4 Claims, 1 Drawing Sheet

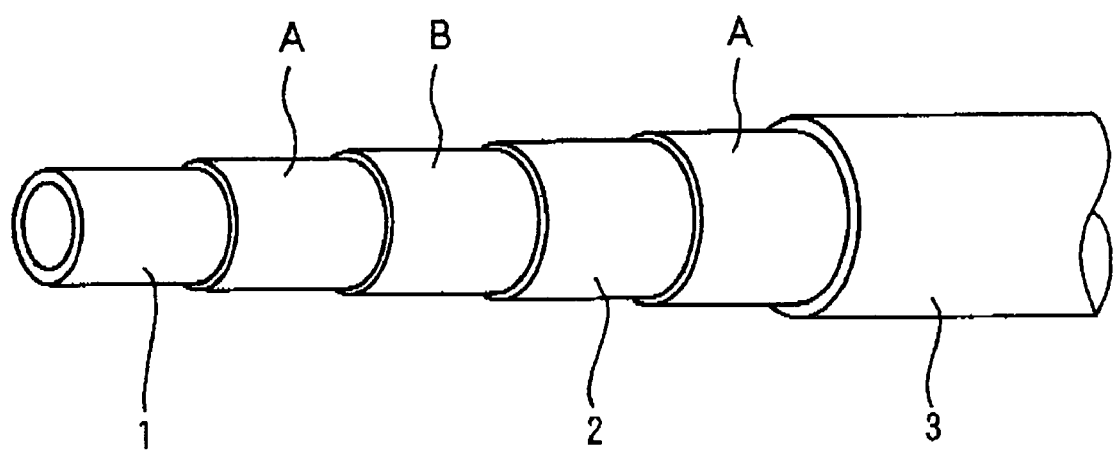
Figure

HOSE AND METHOD OF PRODUCING THE SAME

BACKGROUND OF THE INVENTION

1. Field of the Invention

The present invention relates to a hose having a structure that a metal plating layer is formed in resin layers, and a method of producing the same.

2. Description of the Art

For example, as a fuel hose for automotive vehicles, Japanese Unexamined Patent Publication No. 8-269723 proposes a hose having a metal plating layer having low permeability to fuel as an intermediate layer formed in a peripheral wall (resin layer) constituting the fuel hose in order to improve low permeability to fuel.

Such a hose having a metal plating layer incorporated therein is produced as follows. A tubular resin inner layer is extrusion molded using a resin containing talc. An outer peripheral surface of the resin inner layer is etched using an etching solution containing a palladium catalyst. By this etching, talc present on the outer peripheral surface of the resin inner layer is removed to form depressed portions of the removed traces, and at the same time, palladium is fixed to the outer peripheral surface (including the surface of the depressed portions) of the resin inner layer. A metal plating layer is formed on the outer peripheral surface of the resin inner layer by electroless plating. The metal plating layer is further strongly adhered to the outer peripheral surface of the resin inner layer by an anchor effect due to the depressed portions. Thereafter, a tubular resin outer layer is extrusion molded on an outer peripheral surface of the metal plating layer. Thus, the hose is produced.

Specifically, in forming the metal plating layer in the above hose, talc is added to a material for forming the resin inner layer in order to exhibit the anchor effect.

However, a resin member (the resin inner layer) containing talc is easy to break. For example, when fitting the above hose or press inserting the hose in a connector, there is the possibility that the resin inner layer breaks. Further, in a method of producing such a hose, it takes much time (about several ten minutes) in the above-described etching and palladium fixing, and in-line production is difficult. In addition, the etching is not preferable in the standpoint of environment. Moreover, when a resin layer (resin outer layer) is directly formed on the outer peripheral surface of the metal plating layer, adhesive force between the metal plating layer and the resin outer layer is weak, resulting in lack of reliability of a product (hose).

SUMMARY OF THE INVENTION

The present invention has been made in view of the above circumstances. Accordingly, one object of the present invention is to provide a hose that does not require to contain talc in a resin layer even when forming a metal plating layer on an outer peripheral surface of the resin layer, making it possible to omit steps of etching and palladium fixing, which require much time, prior to formation of the metal plating layer, and can improve adhesive force between the metal plating layer and a resin outer layer. Another object of the present invention is to provide a method of producing the hose.

To achieve the above objects, the hose according to one object of the present invention includes a tubular resin inner layer, a metal plating layer formed on an outer peripheral surface of the resin inner layer, and a resin outer layer formed on an outer peripheral surface of the metal plating layer, wherein a multilayered film including a chromium oxide film and a metal film is formed between the resin inner layer and the metal plating layer, the chromium oxide film of the multilayered film is positioned on the outer peripheral surface of the resin inner layer, the metal plating layer is positioned on an outer peripheral surface of the metal film in the multilayered film, a single-layer film of a chromium oxide film or a multilayered film including the chromium oxide film is formed between the metal plating layer and the resin outer layer, and the resin outer layer is positioned on an outer peripheral surface of the chromium oxide film in the multilayered film.

The method of producing the hose according to another object of the present invention includes: a step of forming a chromium oxide film on an outer peripheral surface of a resin inner layer by at least one physical deposition selected from the group consisting of sputtering, ionic plating and vacuum deposition; a step of forming a metal film on an outer peripheral surface of the chromium oxide film by the physical deposition; a step of forming a metal plating layer on an outer peripheral surface of the metal oxide film; a step of forming a single-layer film of a chromium oxide film or a multilayered film including the chromium oxide film on an outer peripheral surface of the metal plating layer by the physical deposition; and a step of forming a resin outer layer on an outer peripheral surface of the chromium oxide film in the multilayered film.

The hose of the present invention has a structure that the multilayered film including the chromium oxide film and the metal film is formed between the resin inner layer and the metal plating layer, the chromium oxide film in the multilayered film is positioned on the outer peripheral surface of the resin inner layer, and the metal plating layer is positioned on the outer peripheral surface of the metal film in the multilayered film. In this structure, the chromium oxide film and the metal film are formed on the outer peripheral surface of the resin inner layer by the physical deposition such as sputtering prior to the formation of the metal plating layer. Due to this, the present invention does not require containing talc in the resin inner layer, and etching and palladium fixing to the outer peripheral surface of the resin inner layer, that have conventionally been required for the formation of the metal plating layer. As a result, the resin inner layer is difficult to break, and in the course of production of the hose, the productivity is improved. Further, in the structure between the resin inner layer and the metal plating layer, adhesive force between the resin inner layer and the chromium oxide film is strong, adhesive force between the chromium oxide film and the metal film is strong, and adhesive force between the metal film and the metal plating layer is strong. As a result, adhesive force between the metal film and the metal plating layer is strong. Further, by forming the metal film, the metal plating layer can be formed by either of electrolytic method and electroless method. Additionally, the single-layer film of the chromium oxide film or the multilayered film including the chromium oxide film is formed between the metal plating layer and the resin outer layer, and the resin outer layer is positioned on the outer peripheral surface of the chromium oxide film in the multilayered film. Thus, in the structure wherein the resin outer layer is formed on the metal plating layer through the chromium oxide film, adhesive force between the metal plating layer and the resin outer layer is strong.

The hose of the present invention has a structure that the multilayered film including the chromium oxide film and the metal film is formed between the resin inner layer and the metal plating layer, the chromium oxide film in the multilayered film is positioned on the outer peripheral surface of the resin inner layer, and the metal plating layer is formed on the outer peripheral surface of the metal film in the multilayered film. Due to this structure, the hose of the present invention does not require to contain talc in the resin inner layer, and as a result, the resin inner layer is difficult to break. Adhesive force between the resin inner layer and the metal plating layer is improved due to the presence of the multilayered film including the chromium oxide film and the metal film. Further, the single-layer film of the chromium oxide film or the multilayered film including the chromium oxide film is formed between the metal plating layer and the resin outer layer, and the resin outer layer is positioned on the outer peripheral surface of the chromium oxide film. As a result, adhesive force between the metal plating layer and the resin outer layer is improved. Consequently, reliability of a product (hose) can sufficiently be obtained.

The method of producing the hose according to the present invention involves forming the chromium oxide film on the outer peripheral surface of the resin inner layer by physical deposition such as sputtering, and forming the metal film on the outer peripheral surface of the chromium oxide film by the physical deposition. The metal plating layer is then formed on the outer peripheral surface of the metal film. This makes it unnecessary to contain talc in the resin inner layer in forming the metal plating layer. As a result, the resin inner layer can be difficult to break. Further, it is possible to omit steps of etching and palladium fixing to the outer peripheral surface of the resin inner layer, that require much time. This makes it possible to improve the productivity. Further, by forming the metal film, the metal plating layer can be formed by either of electrolytic method and electroless method.

In particular, where an operation after formation of the metal film on the outer peripheral surface of the resin inner layer and until transferring to a step of forming the metal plating layer on the outer peripheral surface of the metal film is conducted under an inert gas atmosphere, the metal plating layer is formed without forming an oxide coating on the outer peripheral surface of the metal film. As a result, it is not necessary to remove such an oxide coating on the outer peripheral surface of the metal film, and productivity can further be improved.

BRIEF DESCRIPTION OF THE DRAWING

The attached FIGURE is a structural view showing one embodiment of the hose according to the present invention.

DETAILED DESCRIPTION OF THE PRESENT INVENTION

The present invention is described in detail below by referring to the embodiment shown in the accompanying drawing.

The FIGURE shows one embodiment of the hose according to the present invention. The hose of this embodiment is a tubular hose having six-layered structure, and a resin inner layer 1, a chromium oxide film A, a metal film B, a metal plating layer 2, a chromium oxide film A and a resin outer layer 3 are formed successively in the order from the inside thereof.

The hose can be produced by, for example, the following method. The resin inner layer 1 is first extrusion molded. The chromium oxide film A is formed on an outer peripheral surface of the resin inner layer 1 by physical deposition such as sputtering, ionic plating or vacuum deposition. The metal film B is formed on an outer peripheral surface of the chromium oxide film A by the physical deposition such as sputtering. The metal plating layer 2 is formed on an outer peripheral surface of the metal film B by electrolytic plating or electroless plating. The chromium oxide film A is formed on an outer peripheral surface of the metal plating layer 2 by the physical deposition such as sputtering. The resin outer layer 3 is extrusion molded on an outer peripheral surface of the chromium oxide film A. Thus, the hose can be produced.

Prior to formation of the chromium oxide film A, the outer peripheral surface of the resin inner layer 1 may be subjected to a pre-treatment such as plasma treatment, corona discharge treatment or ultraviolet treatment in order to increase adhesive force between the chromium oxide film A and the resin inner layer 1.

In the production method of the hose, the formation of the metal film B (physical deposition such as sputtering) is conducted in a reaction furnace under reduced pressure, and the subsequent formation of the metal plating layer 2 (electrolytic plating or electroless plating) is conducted in a plating solution. For this reason, it is preferable that an operation after formation of the metal film B and until dipping in the plating solution (transferring to a step of forming the metal plating layer 2) is conducted under an inert gas atmosphere (nitrogen gas or the like) such that the metal film B does not contact with air (oxygen). By this procedure, the metal plating layer 2 is formed without formation of an oxide coating on the outer peripheral surface of the metal film B. As a result, adhesive force between the metal film B and the metal plating layer 2 is increased, and the work for removing such an oxide coating is not required. Contrary to this, where the operation is not conducted under the inert gas atmosphere, the metal film B contacts with air (oxygen), so that an oxide coating is formed on the surface of the metal film B, and the metal plating layer 2 cannot be formed on the metal film B through the oxide coating. For this reason, treatment such as etching for removing the oxide coating is required to form the metal plating layer 2, and this requires a little time (about 10 to 20 minutes).

Thus, in the above hose, the chromium oxide film A and the metal film B are formed on the outer peripheral surface of the resin inner layer 1 by the physical deposition such as sputtering prior to the formation of the metal plating layer 2. This does-not require containing talc in the resin inner layer, and etching and palladium fixing to the outer peripheral surface of the resin inner layer, that have conventionally been required for the formation of the metal plating layer 2.

In other words, where talc is contained in the resin inner layer as in the conventional hose, the resin inner layer is liable to break, and reliability of a product lacks. Contrary to this, when the chromium oxide film A and the metal film B are formed on the outer peripheral surface of the resin inner layer 1 by the physical deposition prior to the formation of the metal plating layer 2 as in the hose of the present invention, it is not necessary to contain talc in the resin inner layer 1, and the resin inner layer 1 is difficult to break.

Further, etching and palladium fixing to the outer peripheral surface of the resin inner layer, that have conventionally been conducted, require much time (about several ten minutes), and this resulted in deterioration of productivity. Contrary to this, as described above, because the chromium oxide film A and the metal film B are formed on the outer peripheral surface of the resin inner layer 1 by the physical deposition prior to the formation of the metal plating layer 2 in the hose of the present invention, it is not necessary to conduct the above-described etching and palladium fixing. Further, formation of the chromium oxide film A and the metal film B does not require much time (about 2 to 3 minutes). For this reason, the productivity is improved in the method of producing the hose of the present invention.

Between the resin inner layer 1 and the metal plating layer 2, the chromium oxide film A has strong adhesive force to the resin (rein inner layer 1), and also has strong adhesive force to the metal film B. Further, because the metal film B and the metal plating layer 2 are made of a metal, adhesive force therebetween is also strong. Because of this, adhesive force between the resin inner layer 1 and the metal plating layer 2 is strong.

Between the metal plating layer 2 and the resin outer layer 3, the chromium oxide film A has strong adhesive force to the metal plating layer 2, and also has strong adhesive force to the resin outer layer 3. Because of this, adhesive force between the metal plating layer 2 and the resin outer layer 3 is strong.

Size of the hose, and sizes of the resin inner layer 1, the chromium oxide film A, the metal film B, the metal plating layer 2 and the resin outer layer 3, constituting the hose are described below. The size of the hose and each layer varies depending on the use purpose and the like of the hose, and is not particularly limited. However, for example, where the hose is a fuel hose, the hose is set to have an inner diameter (inner diameter of the resin inner layer 1) in a range of from 2 to 40 mm, and preferably from 2.5 to 36 mm, and an outer diameter (outer diameter of the resin outer layer 3) in a range of from 3 to 44 mm, and preferably from 4 to 40 mm. The resin inner layer 1 is set to have a thickness in a range of from 0.02 to 1.0 mm, and preferably from 0.05 to 1.0 mm. The thickness of the respective chromium oxide film A and metal film B is set in a range of from 5 nm to 10 µm, and preferably from 10 nm to 3 µm. If the film thickness is too small, it is difficult to form a uniform film, and low permeability to fuel and interlaminar adhesion tend to deteriorate. On the other hand, where the film thickness is too large, the film is liable to break, and the production cost increases. The metal plating layer 2 is set to have a thickness of from 1 to 500 µm, and preferably from 1 to 100 µm. The resin outer layer 3 is set to have a thickness of from 0.2 to 1.5 mm, and preferably from 0.3 to 1.0 mm.

Materials for forming the resin inner layer 1, the chromium oxide film A, the metal film B, the metal plating layer 2 and the resin outer layer 3, constituting the hose are described below.

The material for forming the resin inner layer 1 varies depending on the purpose of use of the hose, the kind of a fluid flown in a hollow portion, and the like, and is not particularly limited. However, for example, where the hose is used as a low permeable resin hose having excellent permeation resistance to fuels or cooling media, a polyarylene sulfide (PAS) resin, a polyamide resin, a polyamideimide resin, a polyimide resin, a polyester resin or the like is used. Those resins are used alone or as mixtures of two or more thereof. Of those, the PAS resin and polyamide resin are preferably used from the standpoints that those are excellent in low permeation performance, and further have excellent interlaminar adhesion to the chromium oxide film A formed on the outer peripheral surface of the resin inner layer 1.

Of the PAS resin, a polyphenylene sulfide (PPS) resin is preferable from the standpoint of cost or the like. Examples of the polyamide resin include polyamide 6 (PA6), polyamide 66 (PA66), polyamide MXD6, polyamide 9T (PA9T) and polyamide 6T (PA6T). Examples of the polyester resin include a polyethylene terephthalate (PET), a polybutylene terephthalate (PBT), a polyethylene naphthalate (PEN) and a polybutylene naphthalate (PBN).

The metal material for the chromium oxide film A is not particularly limited, and examples thereof include oxides of metals containing chromium oxide or chromium, such as stainless steel (SUS) oxide or nickel-chromium oxide. Different kind of a metal other than chromium, or a metal oxide other than the chromium oxide may be used together. The chromium oxide film A can be formed by reacting chromium or a chromium-containing alloy material with oxygen by the physical deposition when forming a film, or by forming a film using the chromium-containing oxide material.

The metal material for the metal film B is not particularly limited, and the examples thereof include aluminum, magnesium, iron, copper, nickel, titanium, chromium, stainless steel, tantalum, cobalt, palladium, gold, platinum, silver, carbon, silicon, molybdenum, tungsten, selenium, tin, indium, zinc, vanadium, zirconium, yttrium, and their alloys. Those are used alone or as mixtures of two or more thereof. Of those, a nickel-chromium alloy, chromium and stainless steel are preferable from the standpoints of adhesiveness to the metal plating layer 2 and the chromium oxide film A, and film formation rate.

The metal material used for the metal plating layer 2 is not particularly limited, and examples thereof include nickel, copper, silver, gold, chromium, aluminum, zinc, tin, cobalt, tungsten, platinum, palladium, and alloy materials containing at least two kinds of those elements. Nickel and a nickel alloy are preferable from the standpoints of vibration resistance and corrosion resistance. The metal plating layer 2 may be formed by electrolytic plating or electroless plating, but electrolytic plating is preferable from the standpoint of increasing adhesive force to the metal film B.

The forming material for the resin outer layer 3 is not particularly limited, but a polyamide resin is preferably used from the standpoint of having excellent interlaminar adhesion to the chromium oxide film A formed on the inner peripheral surface. In particular, where the hose is used as a fuel hose for automotive vehicles, an aliphatic polyamide resin such as polyamide 11 (PA11), polyamide 12 (PA12), polyamide 610 (PA610) or polyamide 612 (PA612), or a copolymer of those with a polyether, such as a polyamide 6-polyether copolymer or a polyamide 12-polyether copolymer, is more preferably used from the standpoints of resistance to calcium chloride, weathering resistance, impact resistance and the like. Those are used alone or as mixtures of two or more thereof.

In the above embodiment, two layers of the chromium oxide film A and the metal film B are interposed between the resin inner layer 1 and the metal plating layer 2 in the order from the inside. However, so long as the chromium oxide film A is formed on the outer peripheral surface of the resin inner layer 1 and the metal plating layer 2 is formed on the outer peripheral surface of the metal film B, other embodiments can be used. For example, four layers (chromium oxide film A/metal film B/chromium oxide film A/metal film B), six layers (chromium oxide film A/metal film B/chromium oxide film A/metal film B/chromium oxide film A/metal film B), or the like may be interposed. Further, in the above embodiment, a single layer of the chromium oxide film A is interposed between the metal plating layer 2 and the resin outer layer 3. However, so long as it has strong adhesive force to the metal plating 2 and the resin outer layer 3 is formed on the outer peripheral surface of the chromium oxide film A, other embodiments can be used. For example, two layers (metal film B/chromium oxide film A), three layers (chromium oxide film A/metal film B/chromium oxide film A), four layers (metal film B/chromium oxide film A/metal film B/chromium oxide film A), or the like may be interposed.

Other layers may be formed on the inner peripheral surface side of the resin inner layer 1 and/or the outer peripheral surface side of the resin outer layer 3.

The hose of the present invention is preferably used in hoses for transporting fuels (such as gasoline, alcohol mixed gasoline (gasohol), alcohol, hydrogen, light oil, dimethyl ether, diesel oil, CNG (compressed natural gas) or LPG (liquefied petroleum gas)) used in automotive vehicles or transport machines (such as industrial transport vehicles or railroad vehicles, such as an airplane, a folk lift, a shovel car or a crane); hoses for transporting cooling media (such as Freon gas, substituted Freon gas, water or carbon dioxide gas) used in air conditioners, radiators or the like; or fluid pressure hoses used in various equipments.

The present invention is described in more detail by reference to the following Examples with Comparative Examples, but it should be understood that the present invention is not construed as limiting thereto.

Materials for forming a resin inner layer and a resin outer layer, and a watt bath for electrolytic plating shown below were provided.

PPS resin (material for forming resin inner layer)
    TORELINA A670X01, a product of Toray Co.
PA12 resin (material for forming resin outer layer)
    PA12 (a product of EMS, GRILLAMID L25AH, concentration of terminal amino group: 60μ equivalent/g)
Liquid composition, pH and temperature of watt bath

| | |
|---|---|
| Nickel sulfate | 250 g/liter |
| Nickel chloride | 45 g/liter |
| Boric acid | 40 g/liter |
| Pit inhibitor (AKUNA H, a product of Okuno Chemical Industries, Co.) | 2 ml/liter |
| Primary brightener (MU-2, a product of Okuno Chemical Industries, Co.) | 5 ml/liter |
| pH | 4.2 |
| Temperature | 50° C. |

Using the above forming materials, a hose for transporting a fuel was prepared as follows.

EXAMPLES 1 to 3

A resin inner layer was extrusion molded using the PPS resin described above. A chromium oxide film was formed on an outer peripheral surface of the resin inner layer by sputtering using DC magnetron sputtering apparatus under the conditions shown in Table 2 below, and subsequently, a metal film was formed by sputtering under the conditions shown in Table 2 below. The resulting product was taken out of the DC magnetron sputtering apparatus under a nitrogen atmosphere, and then immediately dipped in the watt bath. In the watt bath, electrolytic plating was applied to the outer peripheral surface of the metal film at a current density of 1 A/dm$^2$ for 5 minutes to form a nickel plating layer (metal plating layer). The product was taken out of the watt bath, and the outer peripheral surface of the nickel plating layer was dried. A chromium oxide film was formed on the outer peripheral surface of the nickel plating layer by sputtering using the DC magnetron sputtering apparatus under the conditions shown in Table 2 below. A resin outer layer was extrusion molded on the outer peripheral surface of the chromium oxide film. In this case, the overall thickness of from the resin inner layer to the resin outer layer was set to be 1.5 mm. Thus, a hose for transporting a fuel, having six-layered structure as shown in the FIGURE (inner diameter: 33 mm, outer diameter: 36 mm) was prepared.

COMPARATIVE EXAMPLE 1

A resin inner layer was extrusion molded using the PPS resin. This resin inner layer was dipped in the watt bath, and electrolytic plating was directly applied to an outer peripheral surface of the resin inner layer in the same manner as in the Examples. However, a nickel plating layer (metal plating layer) was not formed. The resin inner layer was dipped in an alkali nickel solution (TMP-CHEMICAL NICKEL, a product of Okuno Chemical Industries, Co.), and electroless plating was conducted at 40° C. for 5 minutes. However, a nickel plating layer (metal plating layer) was not formed. A hose for transporting a fuel composed of only this resin inner layer (inner diameter: 33 mm, outer diameter: 33.2 mm) was designated as Comparative Example 1.

COMPARATIVE EXAMPLE 2

A resin inner layer was extrusion molded using the PPS resin. Only a Ni—Cr metal film was formed on an outer peripheral surface of the resin inner layer by sputtering using the DC magnetron sputtering apparatus under the conditions shown in Table 2 below. Subsequently, a nickel plating layer (metal plating layer), a chromium oxide film, and a resin outer layer were successively formed in the same manners as in the Examples. Thus, a hose for transporting a fuel, having five-layered structure (inner diameter: 33 mm, outer diameter: 36 mm) was prepared.

COMPARATIVE EXAMPLE 3

A resin inner layer was extrusion molded using the PPS resin. A resin outer layer was directly extrusion molded on an outer peripheral surface of the resin inner layer in the same manner as in the Examples. Thus, a hose for transporting a fuel, having two-layered structure (inner diameter: 33 mm, outer diameter: 36 mm) was prepared.

Using each of hoses for transporting a fuel obtained in Examples 1 to 3 and Comparative Examples 2 and 3, each characteristic was evaluated according to the following criteria. The results obtained are shown in Table 1 below.

Permeability Constant

Each hose for transporting a fuel was cut open in a lengthwise direction, and punched into a disc having a diameter of 56 mm to prepare a sample. Using a differential pressure type vapor permeation measurement apparatus (GTR-30XATG, a product of GTR Tech Co.), a permeability constant of an alcohol-added gasoline obtained by mixing the commercially available regular gasoline and ethanol in a volume ratio of 90:10 in each sample was measured at 40° C. for 2 weeks. The permeation constant in the Table shows the value after 2 weeks.

Peel Strength

Each hose for transporting fuel was cut into a long strip having a width of 10 mm to prepare a sample. Each layer at the tip portion of each sample was peeled. The tip portion of each peeled layer of the resin inner layer and the metal plating layer was sandwiched with each chuck of a tensile tester (Orientic Co.), and 180° peel strength between the resin inner layer and the metal plating layer was measured at a tensile rate of 50 mm/min. 180° peel strength between the metal plating layer and the resin outer layer (between the resin inner layer and the resin outer layer in Comparative Example 3) was measured in the same manner as above. Where the peel strength is 20 N/cm or more, it is considered that the interlaminar strength is good.

TABLE 1

|  |  | Example | | | Comparative Example | | |
| --- | --- | --- | --- | --- | --- | --- | --- |
|  |  | 1 | 2 | 3 | 1 | 2 | 3 |
| Resin inner layer | Forming Material | PPS resin | | | | | |
|  | Thickness (mm) | 0.1 | | | | | |
| Chromium oxide film | Forming material | SUS310S oxide film | Ni—Cr oxide film | CrOx | — | — | — |
|  | Thickness (μm) | 0.05 | | | | | |
| Metal film | Forming material | SUS310S | Ni—Cr | Cr | — | Ni—Cr | — |
|  | Thickness (μm) | 0.05 | | | | 0.05 | |
| Metal plating layer | Forming material | Ni | | | *1 | Ni | — |
|  | Thickness (μm) | 10 | | | | 10 | |
| Chromium oxide film | Forming material | SUS310S oxide film | Ni—Cr oxide film | CrOx | — | Ni—Cr oxide film | — |
|  | Thickness (μm) | 0.05 | | | | 0.05 | |
| Resin outer layer | Forming material | PA 12 resin | | | — | PA12 resin | |
|  | Thickness (mm) | Adjusted such that the overall thickness is 1.5 mm | | | | | |
| Permeation constant ($mg \cdot mm/cm^2/day/atm$) | | 0 Detection impossible | 0 Detection impossible | 0 Detection impossible | — | 0 Detection impossible | 0.012 |
| Peel strength (N/cm) | Resin inner layer/metal plating layer | Peeling impossible | Peeling impossible | Peeling impossible | — | 3 | 0 (Resin inner layer/ Resin outer Layer) |
|  | Metal plating layer/resin outer layer | 25 | 30 | 32 | — | 29 | |

*1: Nickel plating (electrolytic and electroless plating) was tried, but a plating layer was not formed.
Weight ratio of Ni—Cr (Example 2 and Comparative Example 2): Ni:Cr = 60:40

TABLE 2

|  | SUS310S oxide film | Ni—Cr oxide film | CrOx | SUS310S | Ni—Cr | Cr |
| --- | --- | --- | --- | --- | --- | --- |
| Ultimate pressure (mPa) | 9.6 | 19.6 | 23.5 | 8.6 | 6.5 | 14.5 |
| Ar flow rate*2 | 100 | 100 | 100 | 100 | 100 | 100 |
| $O_2$ flow rate*2 | 30 | 30 | 30 | — | — | — |
| Reaction gas pressure (Pa) | 0.42 | 0.42 | 0.42 | 0.38 | 0.37 | 0.38 |
| Power applied (kW) | 2 | 2 | 2 | 2 | 2 | 2 |

*2Unit (×10−3 liter/min, at 1 atom, 25° C.)

As is apparent from the results above, the hoses for transporting a fuel according to Examples 1 to 3 are excellent in low permeability to gasoline and interlaminar adhesion. It, is apparent from the result of Comparative Example 1 that where any treatment is not applied to the outer peripheral surface of the resin inner layer, a metal plating layer cannot be formed. It is apparent from the comparison between Examples 1 to 3 and Comparative Example 2 that unless a chromium oxide film is formed on the outer peripheral surface of the resin inner layer, peel strength between the resin inner layer and the metal plating layer is small, and therefore its interlaminar adhesion is poor. It is apparent that the hose for transporting a fuel obtained in Comparative Example 3 is that the resin inner layer and the resin outer layer are not adhered, and low permeability to gasoline is poor as compared with Examples 1 to 3. The reason for this is considered to be that a chromium oxide film, a metal film and a metal plating film are not formed.

What is claimed is:
1. A hose comprising
a tubular resin inner layer,
a metal plating layer formed by electrolytic plating or electroless plating over an outer peripheral surface of the resin inner layer, and
a resin outer layer formed over an outer peripheral surface of the metal plating layer,
wherein
a multilayered film comprising a first chromium oxide film formed by physical deposition and a first metal film formed by physical deposition is formed between the resin inner layer and the metal plating layer, the first chromium oxide film of the multilayered film is positioned on the outer peripheral surface of the resin inner layer, the metal plating layer is positioned on an outer peripheral surface of the first metal film in the multilayered film, a single-layer film of a second chromium oxide film formed by physical deposition or a multilayered film comprising the second chromium oxide film and a second metal film formed by physical deposition is formed between the metal plating layer and the resin outer layer, and the resin outer layer is positioned directly on an outer peripheral surface of the second chromium oxide film.

2. A method of producing the hose as claimed in claim 1, which comprises:

a step of forming a first chromium oxide film on an outer peripheral surface of a resin inner layer by at least one physical deposition selected from the group consisting of sputtering, ionic plating and vacuum deposition;

a step of forming a first metal film on an outer peripheral surface of the first chromium oxide film by the physical deposition;

a step of forming a metal plating layer on an outer peripheral surface of the first metal film by electrolytic plating or electroless plating;

a step of forming a single-layer film of a second chromium oxide film or a multilayered film comprising the second chromium oxide film and a second metal film on an outer peripheral surface of the metal plating layer by the physical deposition; and a step of forming a resin outer layer directly on an outer peripheral surface of the second chromium oxide film.

3. The method of producing the hose as claimed in claim 2, wherein an operation after formation of the first metal film on the outer peripheral surface of the resin inner layer and until transferring to a step of forming the metal plating layer on the outer peripheral surface of the first metal film is conducted under an inert gas atmosphere.

4. The hose as claimed in claim 1, wherein a metal material for the first and second metal films is a nickel-chromium alloy, chromium or stainless steel.

* * * * *